United States Patent
Gerlach et al.

(10) Patent No.: US 11,970,169 B2
(45) Date of Patent: Apr. 30, 2024

(54) ANTI-LOCK CONTROL METHOD AND ANTI-LOCK CONTROL SYSTEM FOR A BRAKING SYSTEM OF A VEHICLE

(71) Applicant: ZF CV Systems Europe BV, Brussels (BE)

(72) Inventors: Steffen Gerlach, Hannover (DE); Alexander Rodenberg, Braunschweig (DE); Michael Schomburg, Barsinghausen (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/843,696

(22) Filed: Jun. 17, 2022

(65) Prior Publication Data

US 2022/0324453 A1    Oct. 13, 2022

Related U.S. Application Data

(63) Continuation of application No. PCT/EP2020/084066, filed on Dec. 1, 2020.

(30) Foreign Application Priority Data

Dec. 19, 2019    (DE) .................. 10 2019 135 088.3

(51) Int. Cl.
     *B60T 8/175*      (2006.01)
     *B60K 7/00*      (2006.01)
     (Continued)

(52) U.S. Cl.
     CPC ..... *B60W 30/18172* (2013.01); *B60K 7/0007* (2013.01); *B60T 8/17616* (2013.01);
     (Continued)

(58) Field of Classification Search
     CPC ........... B60W 30/18172; B60W 10/08; B60W 10/184; B60W 2520/26; B60W 2520/28;
     (Continued)

(56) References Cited

U.S. PATENT DOCUMENTS

2012/0130581 A1    5/2012    Semsey et al.
2013/0013151 A1    1/2013    Schafiyha et al.
     (Continued)

FOREIGN PATENT DOCUMENTS

CN           101088819 A    * 12/2007    ............ B60W 10/08
DE    10 2010 003 076 A1    8/2011
     (Continued)

OTHER PUBLICATIONS

English translation and Written Opinion of the International Searching Authority dated Feb. 11, 2021 for International application PCT/EP2020/084066 on which this application is based.
(Continued)

*Primary Examiner* — Tisha D Lewis
(74) *Attorney, Agent, or Firm* — Walter Ottesen, P.A.

(57) ABSTRACT

An antilock control method for a braking system of a vehicle has at least the following steps: upon the presence of a brake request signal, outputting a brake control signal and building up a brake pressure by a braking medium at a wheel brake of a vehicle wheel, measuring a wheel speed of the vehicle wheel to be braked, and determining a wheel slip of the vehicle wheel, upon meeting a first traction criterion or a locking tendency of the vehicle wheel, activating a wheel drive unit and applying a wheel drive torque on the vehicle wheel to increase the wheel circumferential velocity and to reduce the wheel slip until a second traction criterion is met. The brake force introduced in the wheel brake is controlled as a function of the wheel slip by releasing the brake pressure upon satisfying a first traction criterion.

12 Claims, 3 Drawing Sheets

(51) Int. Cl.
 *B60T 8/1761* (2006.01)
 *B60W 10/08* (2006.01)
 *B60W 10/184* (2012.01)
 *B60W 30/18* (2012.01)

(52) U.S. Cl.
 CPC .......... *B60W 10/08* (2013.01); *B60W 10/184* (2013.01); *B60T 2240/00* (2013.01); *B60T 2270/10* (2013.01); *B60T 2270/604* (2013.01); *B60W 2520/26* (2013.01); *B60W 2520/28* (2013.01); *B60W 2710/083* (2013.01); *B60W 2710/182* (2013.01)

(58) Field of Classification Search
 CPC ..... B60W 2710/083; B60W 2710/182; B60W 10/188; B60T 8/17616; B60T 2240/00; B60T 2270/10; B60T 2270/604; B60T 2201/09; B60T 8/175; B60T 8/172; B60K 7/0007; B60K 2007/0092
 See application file for complete search history.

(56) References Cited

U.S. PATENT DOCUMENTS

| | | | | |
|---|---|---|---|---|
| 2014/0257616 | A1* | 9/2014 | Wang | ...................... B60L 15/20 |
| | | | | 701/22 |
| 2016/0243943 | A1* | 8/2016 | Sugai | .................. B60L 15/2009 |
| 2019/0344796 | A1* | 11/2019 | Lian | ................ B60W 30/18172 |
| 2020/0156608 | A1* | 5/2020 | Jeon | ................ B60W 30/18127 |
| 2022/0041170 | A1* | 2/2022 | Nishihashi | ............ B60T 8/3215 |

FOREIGN PATENT DOCUMENTS

| | | |
|---|---|---|
| DE | 10 2013 226 894 A1 | 6/2015 |
| DE | 10 2017 211436 A1 | 1/2019 |
| EP | 829401 A2 * 3/1998 .......... B60T 8/17552 |
| EP | 1 935 737 A1 | 6/2008 |
| WO | 2011/083004 A1 | 7/2011 |

OTHER PUBLICATIONS

International Search Report of the European Patent Office dated Feb. 11, 2021 for international application PCT/EP2020/084066 on which this application is based.

* cited by examiner

— v1
---- v2
--- FB2
---- FBth

— v1
--- v2
--- FB2
---- FBth
---- M2

ANTI-LOCK CONTROL METHOD AND ANTI-LOCK CONTROL SYSTEM FOR A BRAKING SYSTEM OF A VEHICLE

CROSS REFERENCE TO RELATED APPLICATIONS

This application is a continuation application of international patent application PCT/EP2020/084066, filed Dec. 1, 2020 designating the United States and claiming priority from German application 10 2019 135 088.3, filed Dec. 19, 2019, and the entire content of both applications is incorporated herein by reference.

TECHNICAL FIELD

The disclosure relates to an antilock control method and an antilock control system for a braking system of a vehicle, in particular a pneumatic braking system of a utility vehicle.

BACKGROUND

Antilock control systems and antilock control methods are used to reduce or limit a locking tendency of braked vehicle wheels. A brake slip occurs during braking of a vehicle wheel, since a wheel circumferential velocity no longer corresponds to a vehicle velocity.

The brake slip can be described here as the relative deviation of the wheel circumferential velocity of the vehicle wheel in relation to a wheel co-rotating with frictional contact on the underlying surface; however, the relative deviation of the wheel circumferential velocity in relation to the vehicle velocity is preferably denoted hereinafter as the brake slip, which thus enables a calculation and assessment independently of the direct contact on the underlying surface. In a wheel rolling with frictional contact on the underlying surface, the wheel circumferential velocity corresponds to the vehicle velocity.

During a braking action, the brake force transmitted from the vehicle wheel to the underlying surface initially increases with the increasing brake slip. However, with higher brake slip, a locking tendency begins or the traction reaches the traction limit, whereupon the brake force exerted by the vehicle wheel on the roadway thereafter decreases, which is also referred to as the locking tendency or locking of the vehicle wheel.

In pressure medium-actuated braking systems, that is, pneumatic or hydraulic braking systems, in antilock control methods, upon recognizing the locking tendency of a vehicle wheel, the brake pressure of the wheel brake actuated by pressure medium is generally reduced or released entirely, so that the vehicle wheel is taken along again by the road in accordance with the coefficient of friction of the underlying surface and therefore the brake slip decreases. The brake force exerted on the vehicle wheel can thus subsequently be increased again by increasing the introduced brake pressure.

Long locking times can occur in this case as a function of the coefficient of friction; in particular on black ice or snow, the coefficient of friction can be so low that the wheel is initially hardly taken along. During the locking, transverse force or lateral force also cannot be transmitted by the wheel in this case, so that the driving stability decreases and cornering is not provided. The brake pressure actually existing in the wheel brake is possibly also initially only reduced with a delay by release of the pressure medium due to the inertia of the operating medium. In particular in pneumatic wheel brakes, the brake pressure in the brake chamber is only dissipated with a corresponding time delay via the connected brake valve, for example, an ABS valve or electropneumatic relay valve, due to the inertia. The compressed air can thus only escape in accordance with the pressure conditions and flow cross sections, so that in spite of activation to release the brake, a certain brake pressure is still applied.

The introduced brake force or the brake pressure can generally be adapted, for example, by an axle load determination. In particular at low coefficient of friction, however, a long locking time of the wheels can occur in spite of the axle load determination, since the brake force introduced by the wheel brake on the vehicle wheel cannot be transmitted as brake force exerted on the underlying surface.

In particular in driven axles, which generally have a higher mass and a higher moment of inertia, the locking time can thus accordingly be long.

SUMMARY

It is an object of the disclosure to provide an antilock control method and an antilock control system which enable a high level of safety and good controllability of the vehicle at low cost.

The antilock control method according to the disclosure is executable in particular by the or using the antilock control system according to the disclosure; the antilock control system according to the disclosure is configured in particular to carry out the antilock control method according to the disclosure.

The disclosure is based on the concept, upon recognizing the blocking tendency or reaching the traction limit, of not only releasing the brake pressure to enable a passive increase of the wheel circumferential velocity due to friction on the underlying surface, but rather actively driving the vehicle wheel in this phase, so that it reaches higher wheel speeds again faster and thus reduces the wheel slip. Therefore, a wheel drive is preferably activated as a function of a first criterion upon recognizing the reaching of the traction limit or a locking tendency. In an electric wheel drive, this can be a wheel hub motor, for example, which enables a rapid responsiveness, to also enable a rapid acceleration in these control phases.

The active wheel drive can thus take place in addition to the release of the brake pressure. In principle, however, the brake pressure can also be entirely or partially maintained if, for example, due to the present conditions, a change of the wheel pressure is recognized as excessively sluggish and would thus take place with an excessively long time delay. Therefore, for example, the wheel speed can in principle be increased by active drive solely to reduce the brake slip.

Therefore, with relatively little expenditure, in particular already provided wheel hub motors, and a corresponding activation with a high level of safety, the locking tendency can be limited in time and reduced to subsequently be able to increase the brake pressure again and achieve a higher brake force exerted by the vehicle wheel on the underlying surface.

On the one hand, a pressure medium-actuated wheel brake, but also, for example, a retarder brake as a wear-free brake can be provided as the wheel brake. If it is recognized in a retarder brake, for example, that the brake force cannot be varied sufficiently quickly, for example, the antilock control can be carried out entirely or completely by activating the wheel drive.

The activation of a drive of a vehicle wheel or an axle is thus advantageously also incorporated in the ABS control according to the disclosure.

The activation of the wheel drive can take place in accordance with the activation of the wheel brakes or the introduced brake pressure. Alternatively thereto, the active wheel drive can also only be introduced to compensate for the brake force still exerted due to the inertia of the system.

The disclosure can be used in principle in any pressure medium-actuated braking system, that is, in a pneumatic or electropneumatic or also in a hydraulic or electrohydraulic braking system.

BRIEF DESCRIPTION OF THE DRAWINGS

The invention will now be described with reference to the drawings wherein.

DESCRIPTION OF THE PREFERRED EMBODIMENTS

Figure 1:
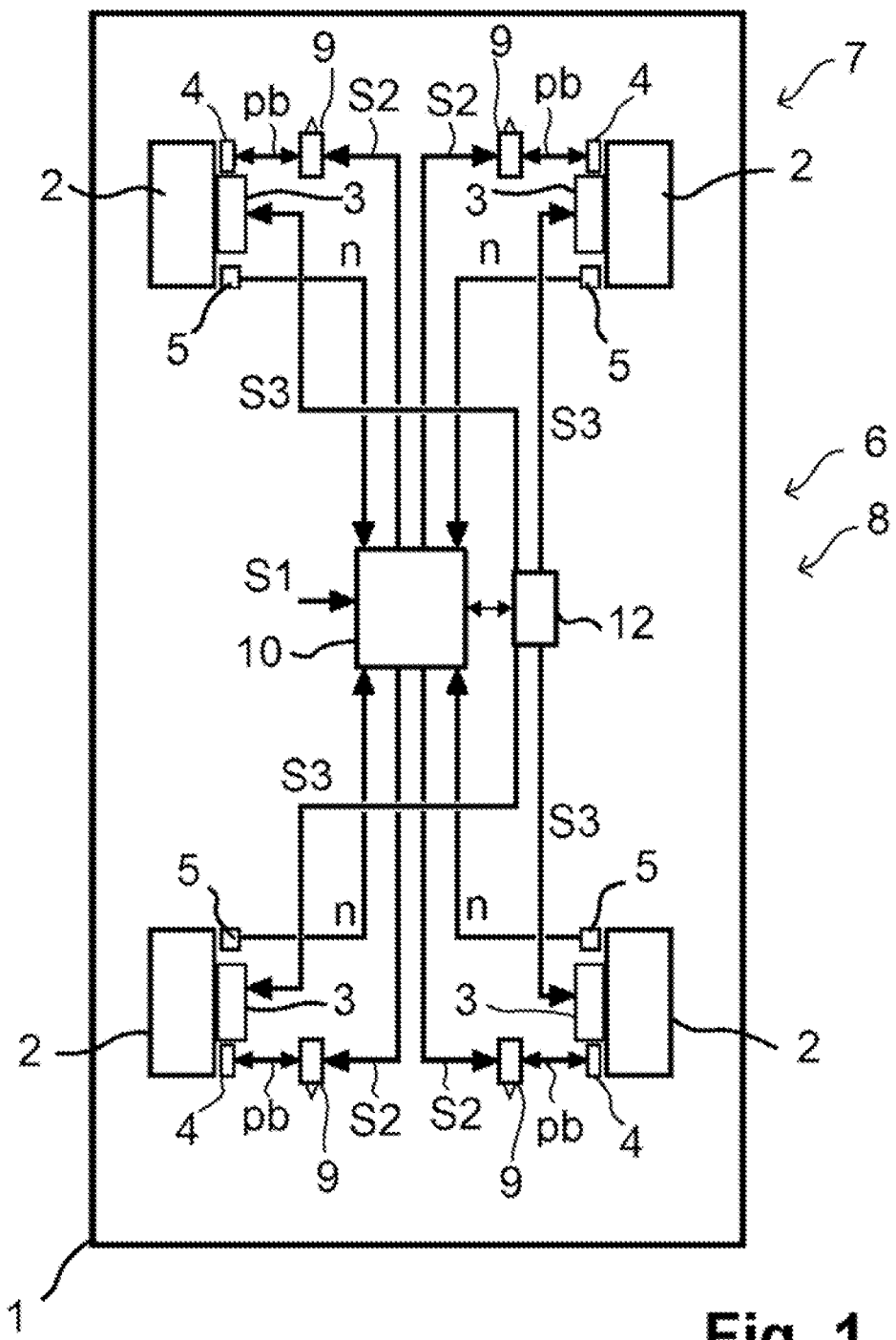
FIG. 1 is a schematic of a vehicle having an antilock control system according to one embodiment of the disclosure.

FIG. 1 shows a schematic of a vehicle 1 having an electric vehicle drive and four wheels 2, which are each driven via an electric wheel hub motor 3 as part of the electric vehicle drive, wherein the electric wheel hub motor 3 enables an individual wheel drive and advantageously also a recuperation, that is, motor braking with reclamation of a part of the kinetic energy as electric energy. The electric vehicle drive can in principle be configured with or without transmission. A hybrid drive having an internal combustion engine and additional wheel hub motors 3 can also be provided in principle. The vehicle is in particular a utility vehicle. The vehicle can be a trailer vehicle.

An electropneumatic braking system 6 is provided in the vehicle 1, preferably as an electronic braking system (EBS), which has a central brake control unit 10 and, for each vehicle wheel 2, a pressure medium-actuated—pneumatic here—wheel brake 4, wheel speed sensors 5 for measuring the wheel speeds n of the individual vehicle wheels 2 and for outputting wheel speed signals to the central brake control unit 10, and in general a valve unit for the pressure medium-actuated wheel brakes 4. According to the simplified illustration in FIG. 1, an electropneumatic valve unit 9 is provided for each vehicle wheel 2, which is activated by the central brake control unit 10 via brake control signals S2 and in particular can be formed having an electropneumatic relay valve and ABS valves, which each output a brake pressure pb at the respective vehicle wheel 2. Furthermore, the electropneumatic braking system 6 has pneumatic components (not shown here), in particular a compressed air accumulator, and further pneumatic and possibly electropneumatic valves.

The central brake control unit 10 can determine, for example, the axle loads of the axles from additionally provided axle load sensors or also from the braking behavior over multiple braking actions and can adapt the brake pressure pb to be set via the brake control signals S2 accordingly.

The vehicle 1 has, as the drive device 8, a drive control unit 12 and the electric wheel hub motors 3. Furthermore, the vehicle 1 has components (not shown further here) such as a battery and corresponding further elements.

The central brake control unit 10 and the central drive control unit 12 exchange data with one another as shown in FIG. 1; they can also be formed integrated.

Upon input of a braking request signal S1 by, for example, the driver or also an autonomous vehicle system, for example, a stability system such as FDR, ESP, an adaptive cruise control such as ACC, or an accident avoidance system, the central brake control unit 10 starts a braking process by outputting brake control signals S2, which, in an EBS, are output, for example, at electropneumatic relay valves for the pneumatic output of the analog brake pressure pb at the wheel brakes 4. Via the respective wheel speed sensors 5, the wheel speeds n of the individual vehicle wheels 2 are determined to carry out an ABS control in the central brake control unit 10.

In the ABS control, the respective wheel circumferential velocity v2 is determined directly from the determined wheel speeds n and a wheel circumferential acceleration is determined therefrom by time derivation, which represents a wheel circumferential deceleration in the case of a negative value. The wheel circumferential velocity v2 is advantageously compared to an ABS reference velocity vref, which is determined in a way known per se over a longer time period from the wheel speeds n and is used as a reference variable for the vehicle velocity v1, which is generally not accurately known. Correspondingly, a slip s of each individual vehicle wheel 2 can be determined from the difference.

Each vehicle wheel 2 can be driven independently from the other vehicle wheels 2 by the wheel hub motors 3. For this purpose, in the embodiment shown, the central drive control unit 12 outputs drive control signals S3 to the respective wheel hub motors 3.

During a braking action, a wheel slip s of the individual vehicle wheels 2 occurs, which is dependent in particular on the coefficient of friction $\mu$. At a lower coefficient of friction $\mu$, in spite of axle load determination, longer locking times $\Delta t$ of the individual vehicle wheels 2 can occur, since the brake force FB1 set in the individual wheel brakes 4 cannot be transmitted to the road. If a locking tendency of a vehicle wheel 2 is established, the central brake control unit 10 controls an antilock control method to keep the locking times $\Delta t$ low.

Figure 2:
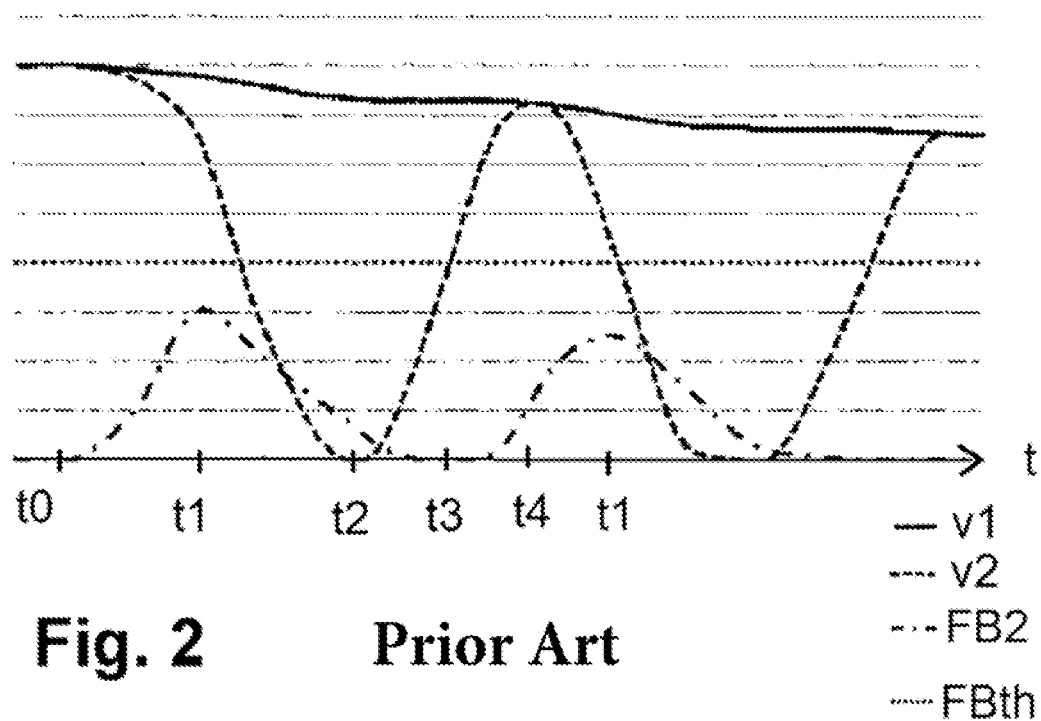
FIG. 2 shows a diagram having the time representation of relevant parameters of an antilock control method in a conventional antilock control method.

FIG. 2 shows a time sequence of a conventional antilock control method, which in principle can also be set in the braking system 6. At a time t0, a brake pressure pb is input via a brake control signal S2 in the respective wheel brake 4, so that the wheel speed n and thus also the wheel circumferential velocity v2 decrease. Upon actuation of the wheel brake 4, a fundamentally permitted wheel slip s begins immediately, that is, a wheel circumferential velocity v2, which is shown by a dashed line in FIG. 2, drops in relation to a vehicle velocity v1 shown as a solid line. Correspondingly, a brake force FB2 transmitted by the vehicle wheel 2 to the road, which is shown in FIG. 2 as a dot-dash line, initially increases and thus approaches a theoretically possible brake force FBth. The wheel slip s subsequently increases in such a way that at the point in time t1, the maximum of the transmitted brake force FB2 is reached and subsequently with increasing wheel slip, the transmitted brake force FB2 decreases, that is, there is a locking tendency or already locking of the vehicle wheel 2. The central brake control unit 10 detects this behavior via the measured wheel speeds n and entirely or partially releases the brake pressure in the conventional ABS, that is, the set brake force FB1 is reduced via the brake control signal S2, in that the wheel brake 4 is vented.

However, the compressed air can only escape here in accordance with the pressure conditions and flow cross sections, so that initially a corresponding brake force FB1 is still exerted on the vehicle wheel 2. Only when the brake force FB1 exerted on the vehicle wheel 2 is nearly completely dissipated is the vehicle wheel 2 sufficiently released, so that it is carried along and accelerated again via contact with the roadway—in accordance with the coefficient of friction μ—so that its wheel circumferential velocity v2 increases again from the point in time t2, and reaches the vehicle velocity v1 again here at the point in time t4. The brake force FB2 transmitted to the road 2 correspondingly has a time delay in relation thereto and still decreases at the point in time t2, reaches a minimum or the value zero at the point in time t3, and subsequently increases again, so that the maximum transmitted brake force FB2 is subsequently reached again at a time t1.

Since the brake force dissipation thus takes place with a time delay, the vehicle wheel 2 only begins to run again when the introduced brake force FB1 is nearly completely dissipated, so that a renewed buildup of the brake force can then in turn take place. Therefore, the theoretical brake force FBth cannot be applied over the entire time period even with a high coefficient of friction μ.

Figure 3:
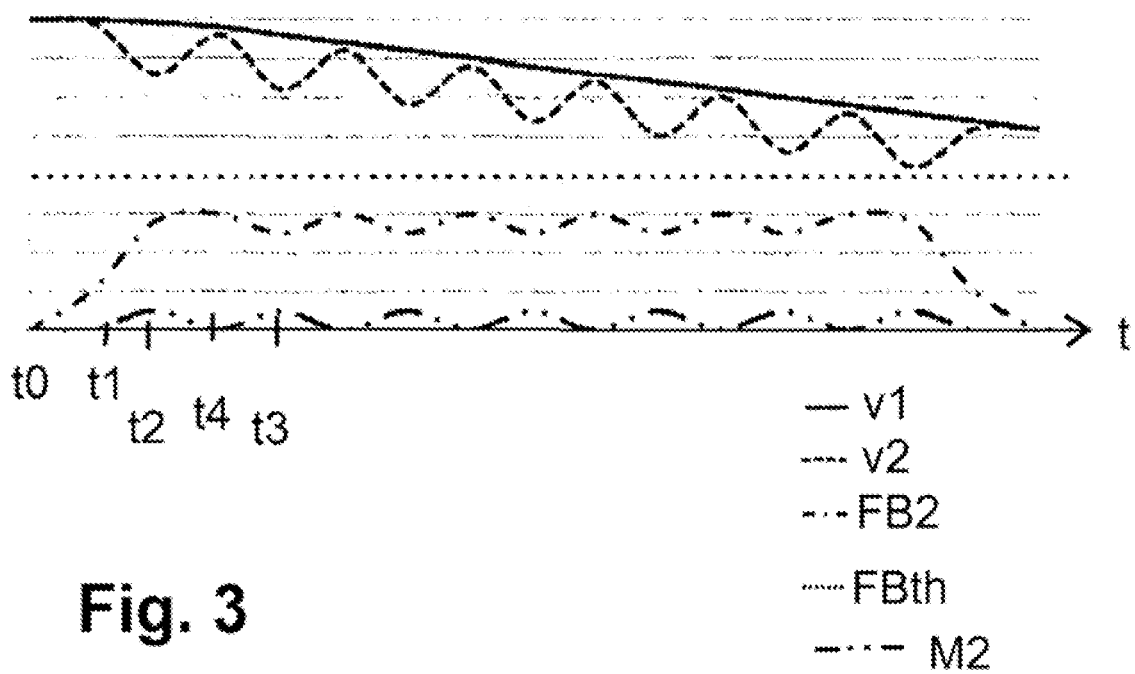
FIG. 3 shows a diagram corresponding to FIG. 2 of an antilock control method according to one embodiment of the disclosure; and, FIG. 4 shows a flow chart of a method according to the disclosure.

FIG. 3 shows an antilock control method provided according to the disclosure with integration of the wheel drive, which is provided alternatively to the ABS control method without active wheel drive shown in FIG. 2. According to the disclosure, it is in this case possible in principle to change between the two ABS control methods of FIGS. 2 and 3; advantageously, however, only the ABS control method with active wheel drive shown in FIG. 3 is used. In this case, during the braking process, the wheel hub motor 3 is temporarily switched on via a drive control signal S3, in particular in phases having locking tendency, to bring the vehicle wheel 2 quickly back to a higher wheel speed n or wheel circumferential velocity v2.

According to FIG. 3, the braking process begins again at the time t0 in that a corresponding brake control signal S2 is output and the brake pressure pb in the wheel brake 4 is increased, so that the set brake force FB1 (not shown here) also increases accordingly. The brake force FB2 transmitted to the roadway thus also increases, and the wheel circumferential velocity v2 or the speed n decreases with beginning braking action.

A locking tendency of the vehicle wheel 2 is checked here, for example, by a first traction criterion K1, that
according to a configuration described further here, reaching a first traction limit ksg1 or lower traction limit is indicated and, for example, the determined wheel slip s is compared to a first slip limiting value sg1; that is, first traction criterion K1: $s \geq sg1$.

According to another embodiment, the first traction criterion K1 can also assess a locking tendency of the vehicle wheel 2, for example, as a comparison of the wheel circumferential deceleration, that is, the time derivative dv2/dt of the wheel circumferential velocity v2, to a deceleration limiting value a2-ref; that is, first traction criterion K1: $|dv2/dt| \geq |a2\text{-ref}|$.

According to FIG. 3, the first traction criterion K1 is met at the time t1, that is, the wheel slip s becomes excessively large, so that a locking tendency begins. Therefore, the wheel hub motor 3 is activated via a drive control signal S3 and driven according to FIG. 3 by a drive torque M2. Therefore, according to FIG. 3—in comparison to FIG. 2—the locking time Δt between the points in time t1 and t2, that is, Δt=t2-t1, can be kept short or even prevented entirely, and in particular also the time span t3-t1, in which no brake force FB2 can be transmitted, can also be kept short.

The drive torque M2 is thus applied to the vehicle wheel 2 tending toward locking, so that it does not lock, while the brake pressure pb and thus also the brake force FB1 exerted by inertia of the operating medium on the vehicle wheel 2 is still dissipated. The brake force FB1 still applied to the vehicle wheel is thus compensated for by the drive torque M2, so that the vehicle wheel 2 accelerates faster and reaches the vehicle velocity v1 again earlier at the time t4, that is, v2=v1.

FIG. 3 again represents an idealized curve here by way of example, since in the control method the vehicle velocity v1, for example, also cannot quite be reached in principle.

In FIG. 3, the drive torque M2 is thus periodically switched on during the antilock control method. If the brake pressure pb and thus the introduced brake force FB1 are sufficiently reduced, the drive torque M2 is switched off and the brake pressure pb is increased again based on the reaction of the vehicle wheel 2.

Shorter control phases are thus generated and in particular the exerted brake force FB2, which is applied by the vehicle wheel 2 to the road, is increased as a whole, on the one hand, and is also kept relatively constant over time, on the other hand, as can be inferred from FIG. 3.

In an embodiment modified from FIG. 3, the brake pressure pb and thus the introduced brake force FB1 can also be maintained during the ABS control method, so that only the electric drive, that is, the wheel hub motor 3 activated via the drive control signal S3 here, assumes the antilock control. In this way, further time can be saved, since the electric drive can react in a significantly faster or more agile manner to the acceleration or deceleration of the vehicle wheel than the pressure medium or operating medium.

According to the disclosure, it is thus also possible in particular to switch over between these three antilock control methods, that is,
the antilock control method without additional electric drive according to FIG. 2,
the antilock control method with electric drive and control of the introduced brake force FB1 according to FIG. 3, and/or
the antilock control method modified from FIG. 3 with control of the drive torque M2 and without control of the brake force, for example, according to a switchover criterion K3, for example, as a function of the coefficient of friction conditions and/or the axle load.

The braking process can be initiated as a driver braking process by input of a driver braking signal S1 and/or by an autonomous braking system, for example, by stability control, by decelerating individual vehicle wheels 2 upon recognized instability as an electronic stability program, furthermore also accordingly in the autonomous braking system, for example, in an adaptive cruise control or an accident avoidance method.

Wheel hub motors 3 or another drive can also be provided, for example, on only one of the axles on the vehicle 1, so that only this axle is controlled with integrated wheel drive according to FIG. 3 and the other axle is not driven and therefore the conventional ABS control method according to FIG. 2 is controlled.

According to FIG. 1, the central brake control unit 10 can be formed separately from the central drive control unit 12, with a data connection, for example, via a CAN bus. Alternatively thereto, these two brake control units 10, 12 can also be formed combined.

A drive slip control can accordingly also be exerted by the two brake control units having a data connection or a combined brake control unit 10, 12.

Instead of the pneumatic wheel brakes 4, a hydraulic braking system having hydraulic wheel brakes 4 can also be provided. Furthermore, a retarder can also be provided as the vehicle brake, that is, so that the wear-free exertion of a braking action takes place via a drive train, for example, of an internal combustion engine.

Figure 4:
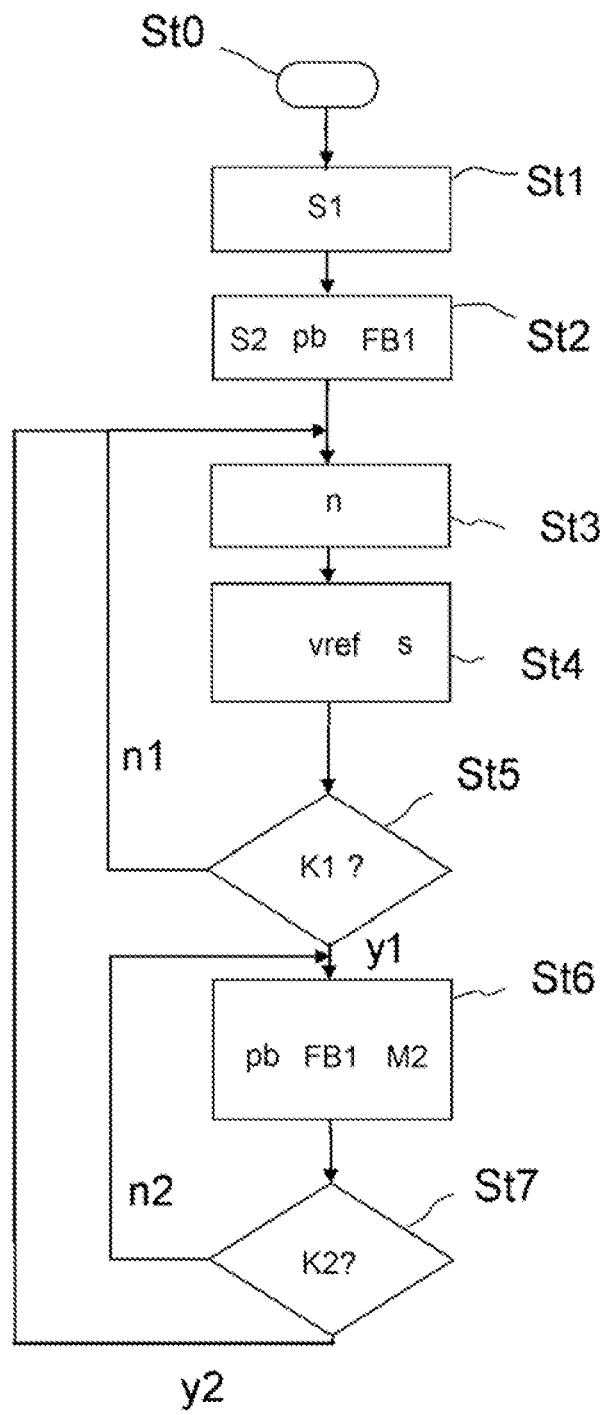

The method according to the disclosure will be explained as follows with reference to the flow chart of FIG. 4:

After the start in step St0, in step St1, a brake request signal S1 is present, for example, due to a driver braking action or also due to an autonomous system, for example, a stability program such as ESC or FDR for selective braking of individual vehicle wheels 2, an adaptive cruise control (ACC), or an accident avoidance system or a system for reducing an accident severity.

In step St2, the brake control signal S2 is therefore subsequently output by the central brake control unit 10, that is, as an electrical control signal here, which is output via the valve unit 9 as the analog pneumatic brake pressure pb at the wheel brake 4 of the relevant vehicle wheel 2, wherein the pneumatic brake pressure pb corresponds to the desired brake force FB1 to be set in order to decelerate the vehicle wheel 2 accordingly.

During step St2, and also progressively thereafter, for this purpose according to step St3, the wheel speed n of the vehicle wheel 2 is progressively determined via the speed sensor 5 and a wheel speed signal is output to the central brake control unit 10.

In step St4, the central brake control unit 10 determines an ABS reference velocity (vref), in particular from a chronological behavior of all wheel speeds n of all vehicle wheels 2. For this purpose, in addition data about a travel velocity of the drive unit, or in the case of a trailer or trailer vehicle as the vehicle 1, also signals about a travel velocity of the tractor vehicle can also be incorporated. In principle, however, ABS control systems can also autonomously form an ABS reference velocity vref solely from the wheel speeds n by long-term averaging over time and integration, which thus reflects the vehicle velocity v1. Furthermore, the central brake control unit 10 determines the wheel slip s of the vehicle wheels 2.

According to decision step St5, it is checked on the basis of the first traction criterion K1 whether a traction limit is reached or a locking tendency of the braked vehicle wheel 2 exists. The criterion K1 can in particular correspond according to one embodiment to a comparison of the determined wheel slip s to an upper slip limiting value sg1, that is, K1: $s \gtrsim sg1$. The criterion K1 can be determined according to another embodiment by a comparison of the wheel circumferential deceleration, that is, the time derivative dv2/dt of the wheel circumferential velocity v2, to a deceleration limiting value a2-ref, that is, with respect to the absolute values (without signs) by the comparison: K1:$|dv2/dt| \gtrsim |a2\text{-ref}|$. For example, a2-ref=$-15$ m/s$^2$ is possible. The deceleration limiting value a2-ref is typically negative.

The first traction criterion K1 establishes the start of the antilock control method.

If K1 is not met, according to the branch n1, the method is reset, in particular before step St3. However, if sufficient locking tendency or reaching the traction limit is already present, according to the branch y1, the antilock control method is started as an active intervention subsequently from step St6.

According to the above-mentioned embodiments, from step St6, the introduced brake force FB1 can be kept entirely or partially constant and the locking tendency can be produced solely by control of the introduced drive torque M2.

According to the embodiment alternative thereto, both torques, that is, the drive torque M2 and the braking torque or the set brake force FB1 are controlled in that according to step St6, upon recognition of the blocking tendency, on the one hand, the introduced brake force FB1 is reduced in that initially the brake pressure pb output on the wheel brake 4 is reduced, for example, by venting the wheel brake 4.

Furthermore, the drive torque M2 is introduced or a drive torque M2 applied up to this point is increased, to accelerate the vehicle wheel 2 in this situation so that it obtains traction with the road again. The wheel speed n is progressively determined for this purpose as described above.

For this purpose, the wheel drive torque M2 can be changed as a function of the wheel slip s, in particular while increasing the wheel drive torque M2 in the case of elevated wheel slip s and vice versa.

According to step St7, upon determining that the lower traction limit is reached or the locking tendency is low again, since the vehicle wheel 2 was accelerated again to a sufficient value close to the vehicle velocity, a second traction criterion K2 is met, which indicates, for example, reaching an upper traction limit ksg2, which is equal to or different from the lower (first) traction limit ksg1, and therefore the method is reset according to branch y2.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 vehicle, in particular utility vehicle
2 vehicle wheel
5 wheel speed sensors
4 wheel brake, in particular pneumatic brake
6 electropneumatic braking system, in particular EBS
7 antilock control system
8 electric drive device
9 electropneumatic valve unit
10 central brake control unit
12 central drive control unit
a2-ref deceleration limiting value
FB1 brake force introduced on the vehicle wheel 2
FB2 brake force exerted on the underlying surface
FBth theoretically possible brake force
K1 first traction criterion, reaching a first traction limit
K2 second traction criterion, reaching a second traction limit, equal or not equal to the first traction limit
K3 switchover criterion
ksg1 lower (first) traction limit
ksg2 upper (second) traction limit
M2 wheel drive torque
n wheel speed pb brake pressure
s wheel slip
S1 brake request signal
S2 brake control signal
S3 drive control signal
sg1 slip limiting value
t1 point in time at which the maximum of the transmitted brake force FB2 is reached
t2 point in time at which the wheel circumferential velocity v2 increases again
t3 point in time at which the brake force FB2 transmitted to the road 2 reaches a minimum or the value zero
t4 point in time at which the vehicle velocity v1 is reached again
Δt locking time, time span between t1 and t2
v1 vehicle velocity
v2 wheel circumferential velocity
dv2/dt wheel circumferential deceleration
vref reference velocity of the ABS, measure of the vehicle velocity v1

What is claimed is:

1. An antilock control method for a braking system of a vehicle, the antilock control method comprising the following steps upon input of a brake request signal (S1):
    outputting a brake control signal (S2);
    building up a brake pressure (pb) via a braking medium at a wheel brake of a vehicle wheel (St1, t0);
    measuring a wheel speed (n) of the vehicle wheel to be braked (St3);
    determining at least one of the following:
        i) a wheel slip (s) of the wheel; and,
        ii) wheel circumferential velocity (v2) of the vehicle wheel; and,
    upon satisfying a first traction criterion (K1),
        i) activating a wheel drive unit; and,
        ii) applying a wheel drive torque (M2) to the vehicle wheel to increase the wheel circumferential velocity (v2) and to reduce the wheel slip (s) until a second traction criterion (K2) is satisfied; and,
    the wheel drive torque (M2) being changed as a function of the wheel slip (s) with an increase of the wheel drive torque (M2) when there is an increased wheel slip (s) and a reduction of the wheel drive torque (M2) when there is a reduced wheel slip (s).

2. An antilock control method for a braking system of a vehicle, the antilock control method comprising the following steps upon input of a brake request signal (S1):
    outputting a brake control signal (S2);
    building up a brake pressure (pb) via a braking medium at a wheel brake of a vehicle wheel (St1, t0);
    measuring a wheel speed (n) of the vehicle wheel to be braked (St3);
    determining at least one of the following:
        i) a wheel slip (s) of the wheel; and,
        ii) wheel circumferential velocity (v2) of the vehicle wheel; and,
    upon satisfying a first traction criterion (K1),
        i) activating a wheel drive unit; and,
        ii) applying a wheel drive torque (M2) to the vehicle wheel to increase the wheel circumferential velocity (v2) and to reduce the wheel slip (s) until a second traction criterion (K2) is satisfied;
    wherein a brake force (FB1) introduced in a wheel brake is still controlled as a function of the wheel slip (s);
    wherein, upon satisfying the first traction criterion (K1), the brake pressure (pb) is released; and,
    upon satisfying the second traction criterion (K2), the brake pressure (pb) is increased again.

3. The antilock control method of claim 2, wherein the first traction criterion (K1) is satisfied by reaching a lower traction limit (Ksg1) and the second traction criterion (K2) is satisfied by reaching an upper traction limit (Ksg2) and the brake pressure (pb) is increased again by opening a valve unit.

4. The antilock control method of claim 1, wherein the change of the wheel drive torque (M2) and a change of a set brake force (FB1) take place in a combined or synchronized manner.

5. The antilock control method of claim 4, wherein the change of the set brake force (FB1) is introduced via brake pressure (pb).

6. An antilock control method for a braking system of a vehicle, the antilock control method comprising the following steps upon input of a brake request signal (S1):
    outputting a brake control signal (S2);
    building up a brake pressure (pb) via a braking medium at a wheel brake of a vehicle wheel (St1, t0);
    measuring a wheel speed (n) of the vehicle wheel to be braked (St3);
    determining at least one of the following:
        i) a wheel slip (s) of the wheel; and,
        ii) wheel circumferential velocity (v2) of the vehicle wheel; and,
    upon satisfying a first traction criterion (K1),
        i) activating a wheel drive unit; and,
        ii) applying a wheel drive torque (M2) to the vehicle wheel to increase the wheel circumferential velocity (v2) and to reduce the wheel slip (s) until a second traction criterion (K2) is satisfied;
    wherein at least one of the following applies:
        i) in the first traction criterion (K1), the determined wheel slip (s) is compared to a first slip limiting value (sg1) and the first traction criterion (K1) is satisfied when the determined wheel slip (s) exceeds the first slip limiting value (sg1); and,
        ii) a locking tendency of the vehicle wheel is assessed and the first traction criterion (K1) is satisfied when the locking tendency of the vehicle wheel is greater than a predefined limiting value of the locking tendency of the vehicle wheel.

7. The antilock control method of claim 6, wherein in the first traction criterion (K1), a wheel circumferential deceleration (dv2/dt) formed by time derivation of the wheel circumferential velocity (v2) is compared to a deceleration limiting value (a2-ref) and the first traction criterion (K1) is satisfied when the wheel circumferential deceleration (dv2/dt) exceeds the deceleration limiting value (a2-ref).

8. An antilock control method for a braking system of a vehicle, the antilock control method comprising the following steps upon input of a brake request signal (S1):
    outputting a brake control signal (S2);
    building up a brake pressure (pb) via a braking medium at a wheel brake of a vehicle wheel (St1, t0);
    measuring a wheel speed (n) of the vehicle wheel to be braked (St3);
    determining at least one of the following:
        i) a wheel slip (s) of the wheel; and,
        ii) wheel circumferential velocity (v2) of the vehicle wheel; and,
    upon satisfying a first traction criterion (K1),
        i) activating a wheel drive unit; and,
        ii) applying a wheel drive torque (M2) to the vehicle wheel to increase the wheel circumferential velocity (v2) and to reduce the wheel slip (s) until a second traction criterion (K2) is satisfied;

wherein a switchover occurs as a function of a switchover criterion (K3) between the antilock control with activation of the wheel drive unit and application of the wheel drive torque (M2) and an antilock control without wheel drive.

9. An antilock control system for antilock control of a vehicle wheel, the antilock control system comprising the following:

a central brake control unit;

a wheel brake for applying an introduced brake force (FB1) to the vehicle wheel as a function of a brake control signal (S2) output by said central brake control unit;

a speed sensor for measuring a speed (n) of the vehicle wheel and outputting a speed signal (n) to said central brake control unit;

a wheel drive unit for recording a drive control signal (S3) and applying a wheel drive torque (M2) to the vehicle wheel;

said central brake control unit being configured to determine and evaluate a wheel slip (s) from at least the determined wheel speed signals (n) and an ABS reference velocity (vref) formed from a time behavior; and, upon satisfying a first traction criterion (K1) or a locking tendency of the vehicle wheel, said central brake control unit being further configured to activate the wheel drive unit to apply the wheel drive torque (M2) to reduce the wheel slip (s).

10. The antilock control system of claim 9, wherein the wheel drive unit is configured as at least one of: i) an electric wheel hub motor; and, ii) an electric wheel hub motor with recuperation.

11. The antilock control system of claim 9, wherein a pneumatic braking system having electropneumatic valve units is provided for introducing a pneumatic brake pressure (pb) in the wheel brakes as a function of the brake control signal (S2) from the brake control unit.

12. An antilock control system for antilock control of a vehicle wheel wherein the vehicle has a plurality of wheels, the antilock control system comprising:

a central brake control unit;

a plurality of wheel brakes for applying introduced respective brake forces (FB1) on corresponding ones of said wheels as a function of respective brake control signals (S2) outputted by said central brake control unit;

respective speed sensors for measuring a speed (n) of said vehicle wheel and outputting respective speed signals (n) to said central brake control unit;

wheel drive units for recording respective drive control signals and applying respective wheel drive torques (M2) on corresponding ones of vehicle wheels;

said central brake control unit being configured to determine and evaluate a wheel slip (s) from at least the determined wheel speed signals (n) and an ABS reference velocity (vref) formed from a time behavior; and, upon satisfying a first traction criterion (K1) or a locking tendency of the vehicle wheels, being further configured to activate the wheel drive unit to apply the wheel drive torque (M2) to reduce the wheel slip (s);

a central drive control unit for activating the wheel drive units of corresponding ones of said vehicle wheels using drive control signals (S3); and, said central drive control unit having a data connection to said central brake control unit or being integrated therein.

* * * * *

UNITED STATES PATENT AND TRADEMARK OFFICE
CERTIFICATE OF CORRECTION

PATENT NO. : 11,970,169 B2
APPLICATION NO. : 17/843696
DATED : April 30, 2024
INVENTOR(S) : S. Gerlach et al.

It is certified that error appears in the above-identified patent and that said Letters Patent is hereby corrected as shown below:

In the Specification

In Column 8:

Line 48: delete "5 wheel speed sensors" and insert -- 3 wheel hub motor -- therefor.

Between Lines 49 and 50: insert -- 5 wheel speed sensors -- therefor.

Signed and Sealed this
Twentieth Day of August, 2024

Katherine Kelly Vidal
*Director of the United States Patent and Trademark Office*